United States Patent [19]

Gürtler

[11] 4,371,174
[45] Feb. 1, 1983

[54] COMPRESSION RINGS FOR PISTONS

[75] Inventor: Rudolf W. Gürtler, Weinstadt, Fed. Rep. of Germany

[73] Assignee: Mahle GmbH, Stuttgart, Fed. Rep. of Germany

[21] Appl. No.: 219,833

[22] Filed: Dec. 24, 1980

[30] Foreign Application Priority Data

Jan. 4, 1980 [DE] Fed. Rep. of Germany ....... 3000146

[51] Int. Cl.³ .............................................. F16J 15/20
[52] U.S. Cl. ...................................... 277/24; 277/217
[58] Field of Search ......................... 277/24, 216, 217

[56] References Cited

U.S. PATENT DOCUMENTS 2,368,137  1/1945  Harmon ................................ 277/24

FOREIGN PATENT DOCUMENTS 136610  6/1919  United Kingdom ................ 277/217
246786  8/1926  United Kingdom .................. 277/24

Primary Examiner—Robert I. Smith
Attorney, Agent, or Firm—Murray and Whisenhunt

[57] ABSTRACT

For the avoidance of the build-up of oil carbon in the ring grooves of the pistons of an internal combustion engine, the compression ring (1) has on its inner circumference, distributed over its entire height, a plurality of sharp edges which are formed by projections (2) or recesses (7). The edges are so aligned that, when the compression ring (1) rotates, they act in a scraping manner on any oil carbon that is building up in the radial bottom of the ring groove. The projections (2) or recesses (7) producing the edges are at least 0.5 mm high or deep. For reasons of strength, the sharp edges may be restricted to the ring zone between 70° and 100° on both sides of the ring joint. It is also possible to provide the sharp edges on an intermediate ring (6) to be inserted into the compression ring (1).

8 Claims, 9 Drawing Figures

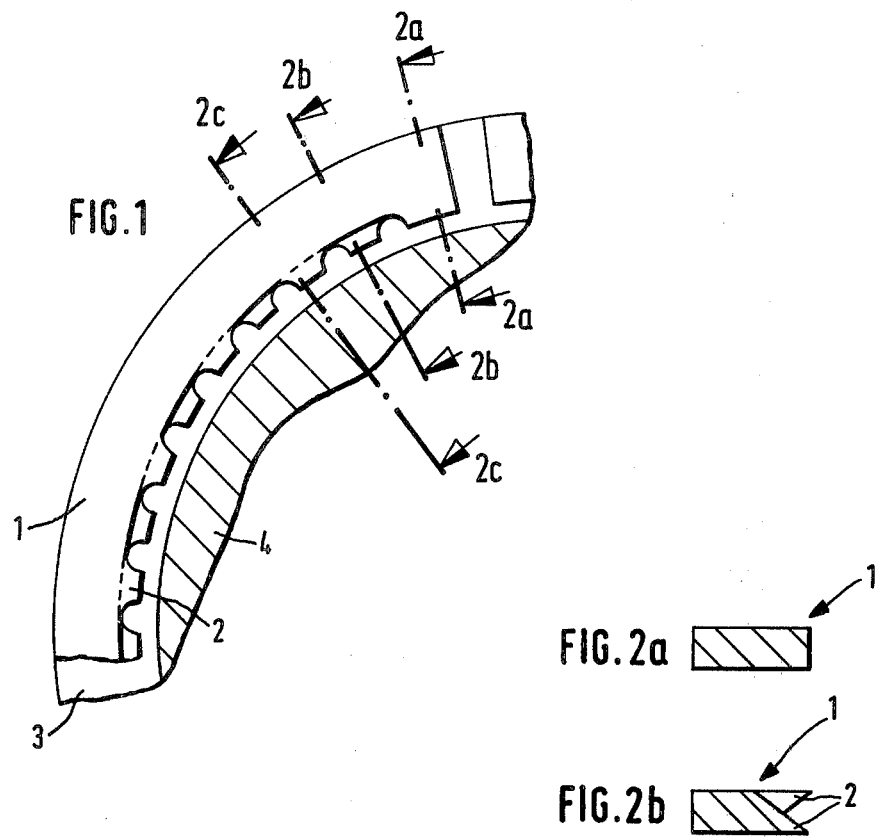
FIG.1
FIG.2a
FIG.2b
FIG.2c
FIG.3
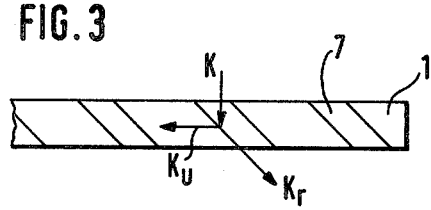

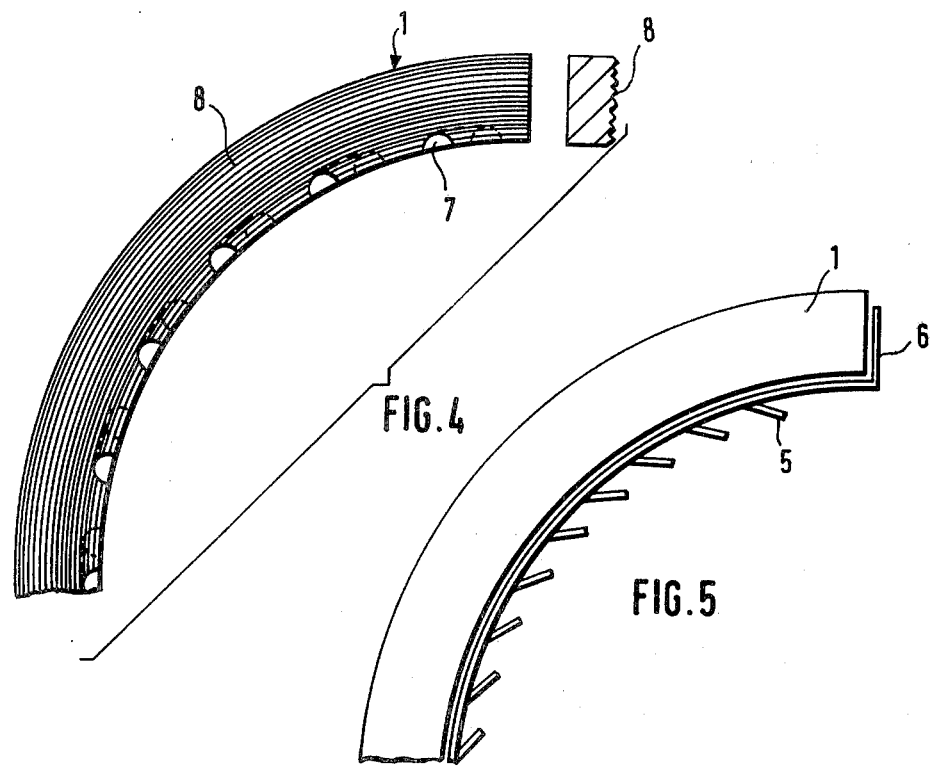
FIG. 4
FIG. 5
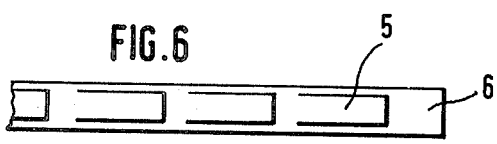
FIG. 6
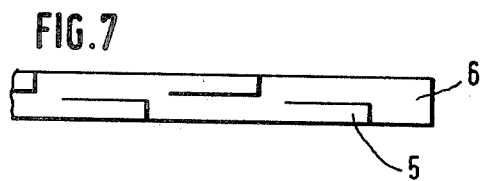
FIG. 7

COMPRESSION RINGS FOR PISTONS

BACKGROUND TO THE INVENTION

The invention relates to a compression ring for internal combustion engine pistons.

Compression rings serve for sealing the combustion chamber relative to the crank case. In order to allow them to fulfil their function satisfactorily, they have to be freely movable in the piston ring grooves receiving them. Their free movability can be impaired by solid deposits which build up in the ring groove such as, in particular, oil carbon. In the most unfavourable case, the deposits cause the ring to become fixed, the result being that ring scuffing occurs and this may then lead to the piston being seized.

STATEMENT OF PRIOR ART

One has hitherto tried to avoid the build-up of oil carbon in the ring groove by various constructional measures such as, for example, specific piston top land clearances as well as a corresponding design of the ring groove and the ring itself. For example, it is known from FR PS No. 1,191,687 to provide the upper and lower flanks of a piston ring with recesses. The recesses start on the inner circumference of the ring and end in front of the radial outer circumference of the ring, so that the travel surface thereof is left untouched by the recesses. By contrast, the recesses end in an open manner on the radial inner circumference so that there are formed zig-zag-shaped edge contours on the upper and lower flanks. Piston rings of this kind are mainly intended for insertion into the first piston ring groove. The recesses in the ring flanks are primarily to ensure that combustion gas can penetrate behind the piston ring into the ring groove, so as to tighten the piston ring for an increase in the sealing function thereof towards the outside. When the piston ring is moved in the ring groove, the recesses are furthermore intended to serve the purpose of continuously scraping any oil carbon that is deposited on the upper and lower flanks of the ring groove and of thus avoiding from the outset any settling of the oil carbon on these flanks. However, since the recesses do not extend on the inner circumference of the ring over the entire axial height thereof, they are not capable of avoiding the build-up of oil carbon in the groove bottom. However, oil carbon deposits in the groove bottom have to be avoided under any circumstances since, if they are of a sufficiently solid consistency, they lead during the course of the engine operation to the ring no longer being capable of carrying out any radial movements. One then says that the ring rides on the oil carbon deposit, the consequence being ring scuffing and finally the commencement of seizure of the pistons.

OBJECT OF THE INVENTION

It is the main object of the present invention to take remedial measures in this respect by keeping the groove bottom free of oil carbon deposits.

SUMMARY OF THE INVENTION

According to the invention there is provided a compression ring for pistons of internal combustion engines which has recesses which are superficially provided outside the travel surface, comprising a plurality of projections distributed over the inner circumference of the compression ring to form a series of sharp edges, said sharp edges being so aligned that, when the compression ring rotates in a piston ring groove, they act in a scraping manner with respect to deposits disposed in the radial bottom of such a groove, said sharp edges lying, at least with one of their ends, jointly in a cylindrical inner boundary.

The cylindrical inner boundary surface of the piston ring does not contain, with respect to the axial height formed by the piston ring or its projections, any ring sections which are closed circumferencewise without a plurality of said aligned sharp edges.

Due to the movement of the compression ring in the axial and radial directions during the engine operation, which movement is constant in relation to the ring groove, the sharp edges of the projections or recesses according to the invention on the inner circumference of the ring, which edges move to the same extent, prevent any oil carbon from being deposited in the free spaces between the ring and the groove. Any oil carbon that does settle there is removed by the sharp edges directly after the formation thereof. For the effectiveness of the edges, it is expedient to make these sufficiently large. The projections or recesses forming the sharp edges have radially a height or depth of at least 0.5 mm.

Furthermore, the ring is to rotate in the same sense of rotation. The sharp edges may be formed by the recesses on the inner circumference of the ring, the force component in the circumferential direction effected by the gas stream in the interior of the ring is produced by the oblique flank sections which are associated with these edges.

In order to prevent the oil carbon not only from building up in the groove bottom but also from the outset from forming any deposits between the ring upper flank and the ring groove flank, it is advantageous to provide the surface of the ring upper flank also with a kind of scraping edges. There are proposed for this purpose radially circumferential grooves.

The sharp edges do not have to be a directly integrated part of the piston ring itself; on the contrary, they may be provided on an intermediate ring which is additionally inserted between the groove bottom and the piston ring. The intermediate ring may expediently consist of spring steel so that the sharp edges can be favourably produced by way of resilient small expanding feet.

BRIEF DESCRIPTION OF THE DRAWINGS

Exemplified embodiments of the invention are illustrated in the drawings, in which:

FIG. 1 shows a top view of a compression ring segment in the ring groove of a piston, FIGS. 2a–c show sections through the compression ring shown in FIG. 1, FIG. 3 shows a view of a compression ring segment with groove-shaped recesses, FIG. 4 shows a top view of the compression ring segment shown in FIG. 3, FIG. 5 shows a top view of a compression ring segment with an intermediate ring according to the invention in the ring groove of a piston, FIG. 6 shows the arrangement of small expanding feet in the centre of an intermediate ring shown in FIG. 5, and FIG. 7 shows an alternative of the arrangement of the small expanding feet in an intermediate ring shown in FIG. 5.

DESCRIPTION OF PREFERRED EMBODIMENT

The compression ring 1 has sharp-edged projections 2 on its inner circumference and lies in the ring groove 3 of a piston 4. The projections 2 may be alternately arranged in the zone of the upper and lower flanks of the compression ring 1. This design is illustrated in the representations of FIGS. 2b and c. The projections 2 may be missing at the joint of the compression ring 1, so as not to affect the sealing function of the ring. It is not necessary for the projections 2 to be arranged alternately in the zones of the upper flank and the lower flank of the piston ring, as shown. On the contrary, it is frequently even better to allow the projections 2 to extend over respectively the entire height of the compression ring 1.

It is also possible to produce sharp edges by way of recesses 7 in the compression ring 1 which are formed as oblique grooves. In this constructional form, all recesses 7 have equidirectional oblique flanks so that the combustion gases which partly flow around the interior of the compression ring 1 cause the ring to rotate. This is effected in that the force K of the gases flowing around the compression ring is divided on the oblique flanks of the recesses 7 into force components $K_u$ and $K_r$. The component $K_u$ ensures that the piston ring is rotated in the circumferential direction. The thus enforced rotational movement imparts to the compression ring the force which is necessary in order to avoid the build-up of oil carbon or to scrape off any oil carbon that is building up with the aid of the sharp edges.

It is also possible to form the sharp edges by small expanding feet 5 on an intermediate ring 6 which is inserted between the compression ring 1 and the groove bottom of the piston 4 and consists of spring steel. The intermediate ring 6 may be connected to the compression ring on the ring joint of the compression ring in such a way that both rings rotate jointly. The resilient small expanding feet 5 contribute to the promotion of the rotation if these feet engage in deposit layers which are to be detached. The alignment of the resilient small expanding feet 5 contribute to this end. The resilient small expanding feet may be centrally arranged on the intermediate ring 6, as shown in FIG. 6, or they may be alternately arranged on the upper flank and the lower flank of the intermediate ring 6.

The edges of the upper flank of the ring according to claim 4 are brought about in the simplest way through circumferential grooves 8 (FIG. 4).

I claim:
1. In a compression ring for pistons of internal combustion engines the provision of:
   (a) a plurality of projections distributed over the inner circumference of the compression ring to form a series of sharp edges.
   (b) said sharp edges being so aligned that, when the compression ring rotates in a piston ring groove, they act in a scraping manner with respect to deposits disposed in the radial bottom of such a groove,
   (c) flanks are associated with sharp edges which are aligned in such a way that the forces of the gases flowing around the compression ring act on the flanks to bring about a rotation of the compression ring.

2. A compression ring according to claim 1, wherein said projections are formed by a series of recesses.

3. A compression ring according to claim 1, wherein the projections forming the sharp edges have radially a height of at least 0.5 mm.

4. A compressing ring according to claim 2, wherein said recesses forming the sharp edges have radially a depth of at least 0.5 mm.

5. A compression ring according to claim 1, wherein the surface of the upper flanks have circumferential sharp edges.

6. A compression ring according to claim 1, wherein the projections are designed as resilient small expanding feet on a separate intermediate ring which bears against the inner circumference of the compression ring.

7. A compression ring for use in a piston ring groove of a piston, said ring having inner and outer circumferential surfaces and opposite side surfaces having a plurality of projections distributed over the inner circumference of the compression ring, said projections having pointed inwardly directed ends, alternate projections having their pointed ends in the plane of the said side surfaces respectively, said projections having sharp edges so aligned that, when the compression ring rotates in a piston ring groove, they act in a scraping manner with respect to deposits disposed in the radial bottom of such a groove.

8. A combination of a piston ring for use in a piston ring groove of a piston with a separate inner ring located around the inner circumferential surface of the ring, said separate ring having an array of feet projecting inwardly thereof at an angle other than a right angle, said feet having sharp edges so arranged that, when the separate ring rotates in the groove they act in a scraping manner to remove deposits disposed in the radial bottom of such groove.

* * * * *